Dec. 13, 1949  C. S. ASH  2,491,150
VEHICLE WHEEL
Filed March 1, 1945  4 Sheets-Sheet 1
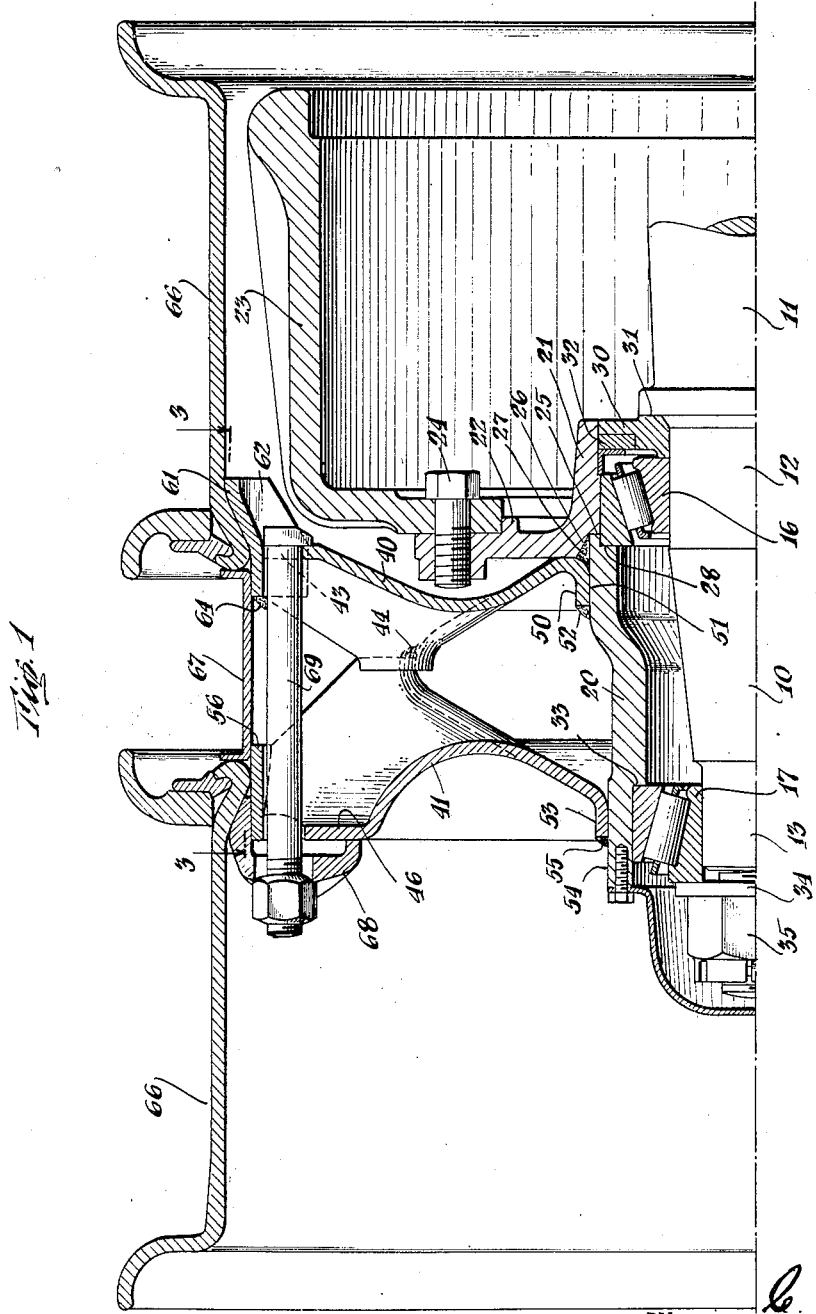
INVENTOR.
C. S. Ash.
BY
Hobart N. Durham
ATTORNEY Dec. 13, 1949 C. S. ASH 2,491,150
VEHICLE WHEEL
Filed March 1, 1945 4 Sheets-Sheet 2
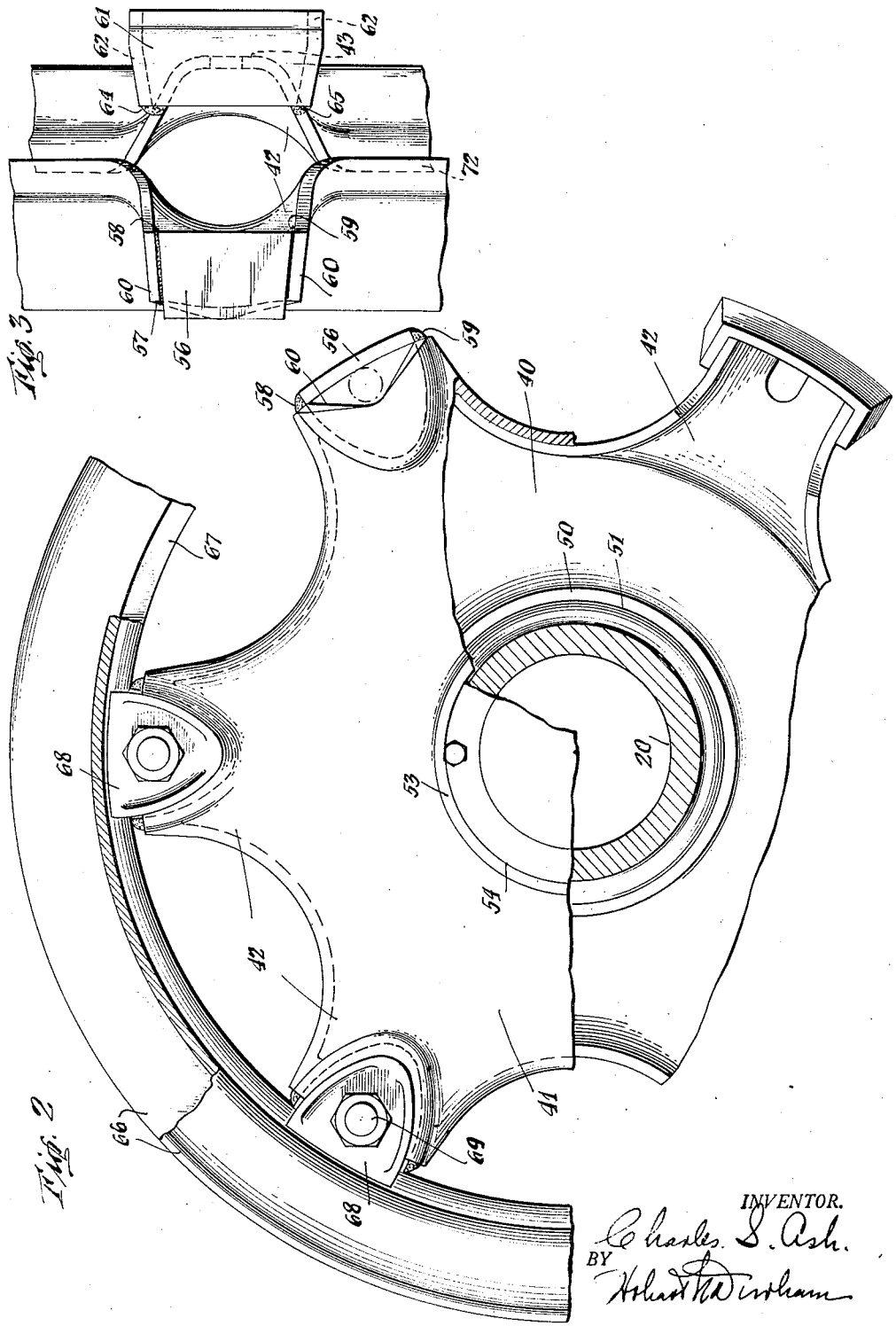
INVENTOR.
Charles S. Ash.
BY
ATTORNEY

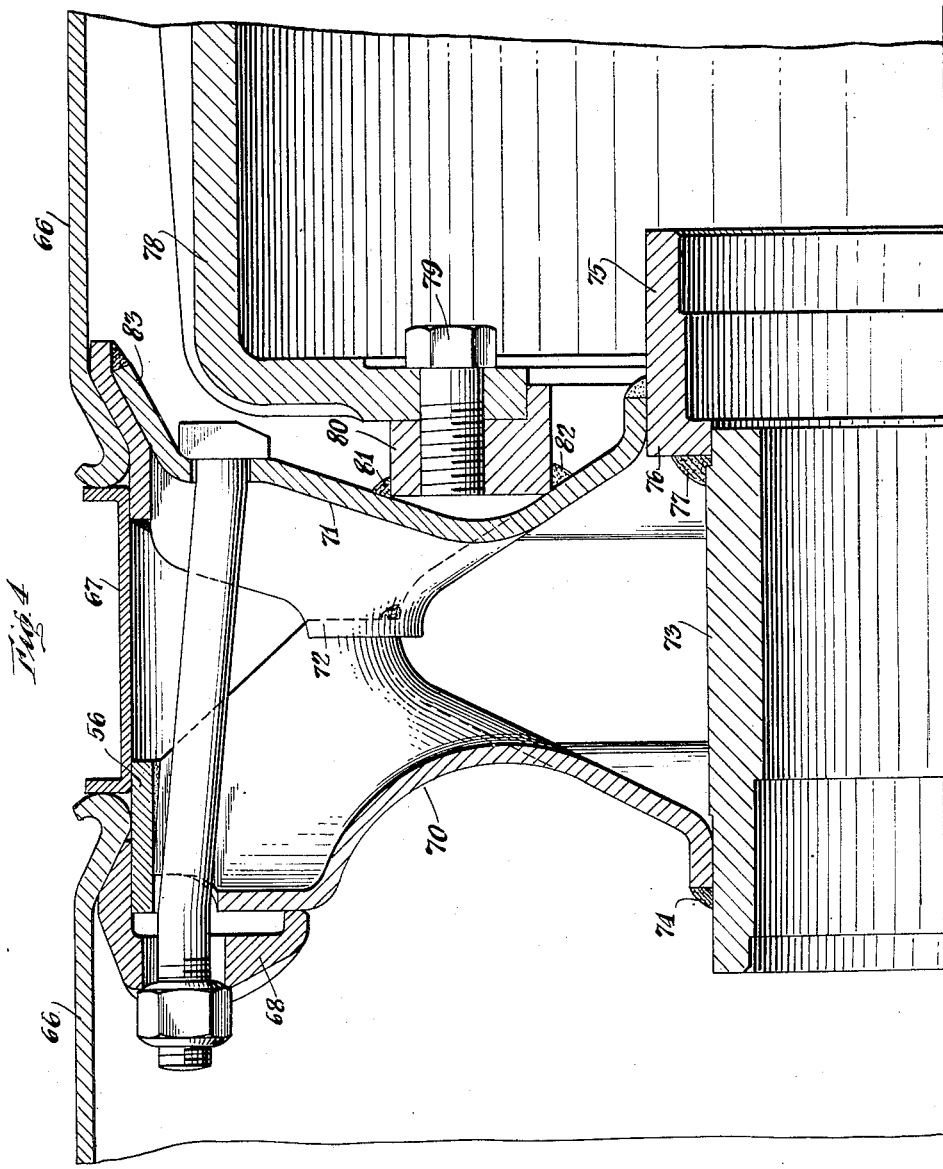

Dec. 13, 1949 C. S. ASH 2,491,150
VEHICLE WHEEL

Filed March 1, 1945 4 Sheets-Sheet 4

INVENTOR
C. S. Ash
BY Hobart G. Durham
ATTORNEY

Patented Dec. 13, 1949

2,491,150

UNITED STATES PATENT OFFICE 2,491,150

VEHICLE WHEEL

Charles S. Ash, Milford, Mich.

Application March 1, 1945, Serial No. 580,399

14 Claims. (Cl. 301—13)

The present invention relates to vehicle wheels and more particularly to vehicle wheels designed to carry a plurality of demountable tire supporting rims.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

In the said drawings:

Fig. 1 is a vertical cross-sectional view of a vehicle wheel assembly above the center-line embodying the present invention adapted to carry a pair of demountable pneumatic tire supporting rims;

Fig. 2 is an end elevation of a portion of the wheel shown in Fig. 1, certain parts being broken away in order to illustrate clearly the construction;

Fig. 3 is a cross sectional view of the wheel taken along line 3—3 of Fig. 1;

Fig. 4 is a vertical cross-sectional view of a modified embodiment of the present invention.

Figure 5:
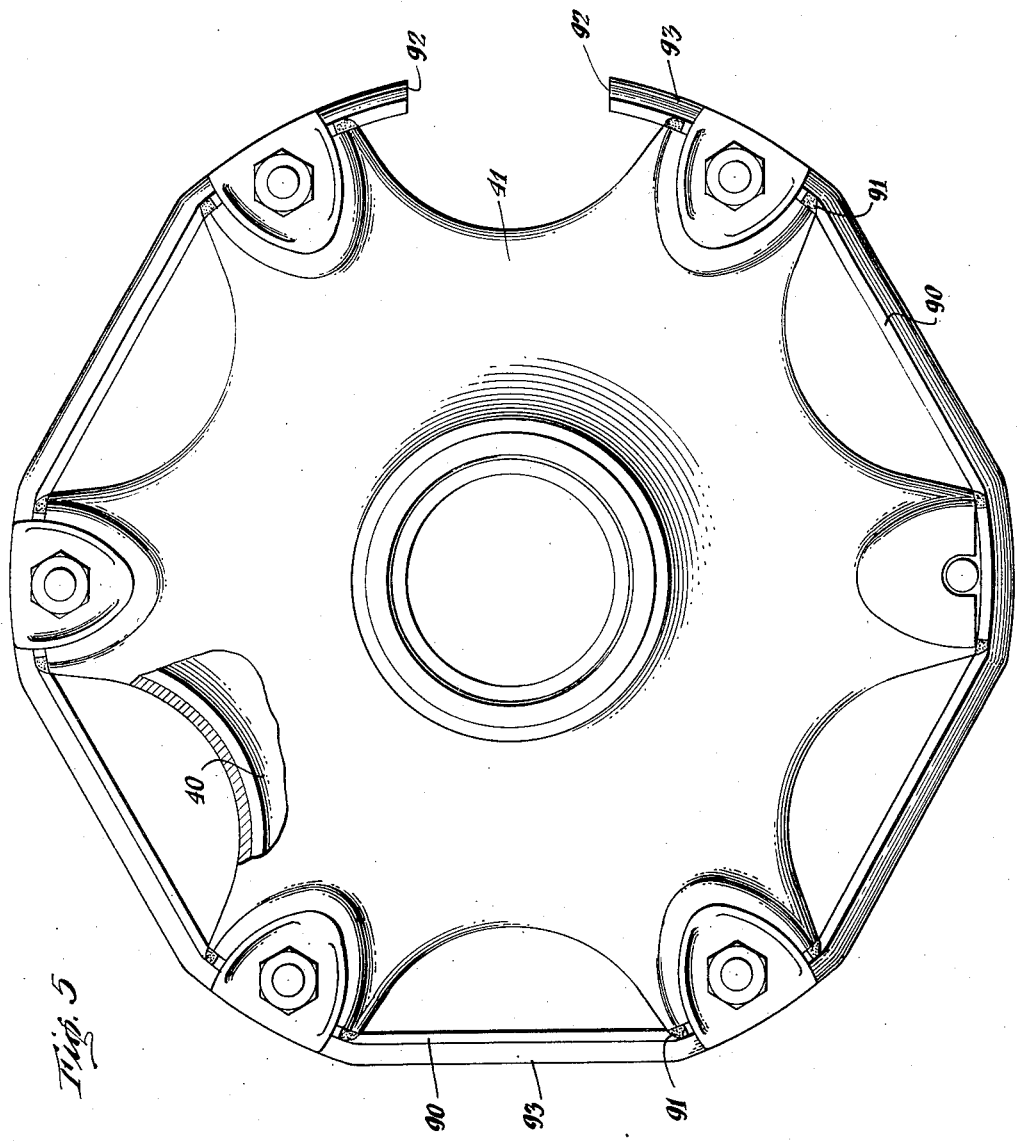
Fig. 5 is an elevation of another modified embodiment of the invention.

It is an object of the present invention to provide a strong, safe and durable vehicle wheel which is adapted to carry a pair of demountable tire supporting rims. The invention further provides a wheel of the characteristics just mentioned which is of relatively simple and lightweight construction, is not complicated to fabricate, and is thus economical to build both in materials and labor. The invention provides a vehicle wheel particularly adaptable to heavy-duty uses such as, for instance, with trucks, trailers, and similar road conveyances, although the wheel is in no way limited to such uses.

Referring now in detail to the illustrative embodiment of the invention shown by way of example in the present drawings, and referring first to the embodiment of Figs. 1 to 3 inclusive, the vehicle wheel is shown as mounted on the reduced end 10 of a trailing type vehicle axle 11. As shown, the axle end 10 is conveniently provided with finished cylindrical portions 12 and 13 for the reception of inner and outer roller bearings 16 and 17 respectively upon which the wheel is mounted for free rotation.

The hub for the wheel is formed from two separately constructed members. As shown, the hub comprises an elongated, substantially cylindrical portion 20 and a shorter portion 21 positioned at the inner end of the portion 20 and provided with an integral outwardly extending annular flange 22 to which is secured a brake drum 23 by means of a plurality of bolts 24. The hub portions 20 and 21 are formed to squarely abut each other as at 25. The portion 21 has a frusto-conically formed surface 26 at the base of flange 22 and the flange slightly overhangs the inner end of hub portion 20, whereby there is provided an annular tapered space to accommodate a circular weld indicated at 27 to strongly join the two hub portions 20 and 21. The inner surface of hub portion 21 is finished as a bearing seat for the inner roller bearing 16, the outer race of which also is seated in a recess 28 at the inner end of hub portion 20. The outer race of bearing 16 thus engages the end of hub portion 20 in recess 28, while the inner race is positioned against the thickened base of annular member 30. Member 30 seats against a shoulder 31 of axle 11, and extends radially outwardly to the inner cylindrical surface of hub portion 21. A bearing ring 32 may be positioned between the cage of bearing 16 and member 30.

The outer roller bearing 17 is received in a finished part of the hub portion 20 at its outer end and seats against a shoulder 33 of the hub. A washer 34 engages the inner race of bearing 17 and a nut 35 on the end of the axle serves to hold the hub and bearing assembly in place.

The body of the vehicle wheel of the present invention comprises inner and outer web portions 40 and 41 respectively, as shown in the first three figures of the drawings. Portions 40 and 41 are pre-formed members such as, for instance, castings or steel stampings. As clearly shown in Fig. 2, the web portions are each integrally formed to provide a radially inner disc or solid portion extending radially outwardly to terminate in a plurality of spoke portions 42, the webs being evenly curved between the spoke portions as shown.

As may be seen in Fig. 1, the outer web portion 41 curves axially inwardly to its curved periphery between its spokes 42, while the spokes themselves and the wheel web directly beneath them in a radial direction curve axially outwardly, terminating in plane portions 46 normal to the axis of the axle. The inner web portion 40, on the other hand, curves axially outwardly to the curved periphery between its spokes 42, and the spokes themselves and the web directly beneath them curves axially inwardly, the spokes terminating in plane portions 43 normal to the axis of the axle. The spokes 42 of each web portion are thus axially spaced apart from the spokes of the other web portion, and the web portions 40 and 41 are so arranged that corresponding spokes are substantially in line axially of the assembly. The disc or solid portions of the web portions 40 and 41 curving toward each other at their outer peripheries between the spokes 42 are joined together by welding as indicated at 44, the web of the outer wheel 41 being so formed as to overlap somewhat the adjoining periphery of the inner wheel web 40.

The web portions 40 and 41 are individually joined at their inner peripheries to the wheel hub portion 20. As shown in Fig. 1, the inner web portion 40 is formed with an integral outwardly turned cylindrical portion 50 which is positioned on a finished outer surface 51 of the hub and welded thereto by a circular line of welding 52. The web curving into cylindrical portion 50 abuts the flange 22 for greater stability of the structure.

The outer web portion 41 at its inner periphery terminates in an outwardly turned cylindrical portion 53 which is seated on a finished surface 54 at the outer end of hub 20 and welded thereto by a line of welding 55.

There is thus provided a strong, light and well balanced wheel and hub assembly, and means are provided at the spoke ends of the web portions for mounting a pair of pneumatic tire carrying rims. As shown in Fig. 3, the means comprise tapered plates 56 securely welded as at 57, 58 and 59 to spoke ends of the outer web portion 41. The spokes terminate in converging shoulders 60 between which the plates 56 are positioned.

The ends of the spokes of the inner web portion 40 are also provided with plates 61, which are of U-cross section providing downwardly turned shoulders or skirts 62 to embrace the spoke ends. The plates 61 are securely welded to the spoke ends at either edge as indicated at numerals 64 and 65.

The plates 56 and 61 for the spoke ends of the wheel web portions 41 and 40 provided seats for duplicate tire rims 66. The inner rim seats against the surfaces of plates 61, the plates being inclined to properly position and hold the rim, and the rim is spaced apart from the outer rim by spacer member 67. The outer rim 66 is held in place on plates 56 and against member 67 by means of lugs 68 which may be of any suitable and conventional design. The lugs are mounted on lug bolts 69 which pass through suitable apertures in the plane portions 46 and 43 of the spokes. The bolts also serve to reinforce the wheel assembly removing strain from the several welded joints.

The embodiment of the invention shown in Fig. 4 of the drawings is similar to the embodiment just described in comprising a pair of wheel web portions 70 and 71 welded together at their overlapping curved peripheries between spokes as at 72. The hub for the embodiment of Fig. 4 is somewhat simpler, comprising cylindrical portion 73 to which the outer web portion 70 is welded as at 74, and a separate cylindrical portion 75 having an inwardly turned flange portion 76 welded to cylindrical portion 73 as at 77.

In this embodiment of the invention the brake drum 78 is secured by means of a plurality of bolts 79 to a brake drum adapter ring 80 welded to the inner face of web portion 71 as at 81 and 82. The spoke ends for the outer web portion 70 are formed identically to the corresponding spokes in the embodiment of the first three figures already described, carrying plates 56. The spokes of the inner web portion 71, however, terminate in axially inwardly inclined portions 83 to which plates 61 are welded, and the latter may be identical to the plates of the same numeral in the first embodiment of the invention. Tire carrying rims 66 are mounted on the spokes by means of spacer 67 and lugs 68 in substantially the same manner already described.

In fabricating the vehicle wheel of the present invention, and referring to the embodiment of the first three figures for purposes of illustration, the hub assembly will be formed by welding together the separate portions 20 and 21. The web portions 40 and 41 are welded together at 44, and the castings can be left rough at these peripheries as they are hidden from the outside of the wheel and welded over. The assembled web portions may then be positioned on the hub portions 20 and 21, and the final operation consists in placing the web and hub assembly in a ring die into which the spoke end plates 56 and 61 are assembled and properly positioned so that when the plates are welded to the spokes, the outside circumference of the wheel including the plates will be a true circle of the desired diameter. Any variation in the spoke ends of the castings or stampings may be compensated for in the individual welds joining the plates to the spokes. If desired, in the interests of economy, the spoke end plates 56 and 61 may be made of hard, strong, non-wearing metal while the integral web portions of the wheels are made of cheaper and softer material.

In Fig. 5 there is shown a further modification of the invention wherein single ring members form the rim bearing members on the inner and outer webs, as, for instance, the webs 40 and 41 of the embodiment of the invention shown in Fig. 1. As shown, the outer rim bearing member 90 is of generally hexagonal form and is positioned between and over the ends of spokes 42 and securely welded thereto as at places 91. Member 90 is interrupted or split at one of its sides between a pair of spokes 42, and surfaces 92 are provided at the adjacent ends of the member. The rim member for use with this embodiment of the invention may be provided with a rectangular or other conveniently formed driving plate secured to its edge to occupy, when the rim is assembled on the wheel, the space between the ends of ring member 90 and abut the surfaces 92. This construction provides a strong spoke construction and allows for a steady and non-loosening wheel and rim assembly with a rim of the construction indicated.

The bearing ring member 93 for the inner web 40 is similarly constructed and affixed to the spokes 42 of its web. As in the previous embodiments of the invention herein described, the ring members 90 and 93 may, if desired, be made of relatively harder and more wear-resistant material than the material of the webs 40 and 41. It will be apparent that the rings 90 and 93 could be substantially circular instead of hexagonal if desired.

I prefer to call the wheel embodying the principles of the present invention a "spoked-disc" wheel since it combines the lightness and other desirable features of a spoked wheel with the strength and integral construction of a disc wheel.

The invention in its broader aspects is not limited to the specific mechanisms shown and described but departures may be made therefrom within the scope of the accompanying claims without departing from the principles of the invention and without sacrificing its chief advantages.

What I claim is:

1. A vehicle wheel comprising, in combination, a tubular hub, and a pair of webs having integral cylindrical portions at their inner peripheries secured in spaced apart relationship to said hub, each said web terminating at its outer periphery in outwardly radially extending integral spokes axially spaced apart from and in substantial axial alignment with corresponding spokes of the other web, said webs between said spokes being axially curved toward and secured to each other.

2. A vehicle wheel comprising, in combination, a tubular hub, and a pair of webs having integral cylindrical portions at their inner peripheries welded in spaced apart relationship to said hub, each said web terminating at its outer periphery in outwardly radially extending integral spokes axially spaced apart from and in substantial axial alignment with corresponding spokes of the other web, said webs being axially curved toward each other at their peripheries between said spokes and positioned in overlapped relationship and welded together.

3. A vehicle wheel comprising, in combination, a tubular hub, and a pair of webs secured at their inner peripheries in spaced apart relationship on said hub, each said web terminating at its outer periphery in outwardly radially extending integral spokes curving axially away from the spokes of the other wheel and being arranged in axially spaced apart and substantially aligned relationship with the corresponding spokes of the other wheel, said webs being axially curved toward each other at their peripheries between said spokes and secured to each other.

4. A vehicle wheel comprising, in combination, a tubular hub, a pair of webs secured at their inner peripheries in spaced apart relationship on said hub, each said web terminating at its outer periphery in integral outwardly radially extending spokes axially aligned with the spokes of the other web, said webs between said spokes being axially curved toward each other and secured to each other, and a plate secured to the end of each spoke said plates having outer surfaces for receiving a tire rim.

5. A vehicle wheel assembly comprising, in combination, an elongated tubular hub member, a second shorter tubular hub member welded to the inner end of the first member and coaxial therewith, said second member having an integral outwardly radially extending flange portion, a brake drum secured to said flange portion, a pair of webs each having an integral cylindrical portion at the inner periphery thereof welded to said first hub member in spaced apart relationship said cylindrical portion of the innermost web abutting said flange portion, each said web terminating at its outer periphery in integral outwardly radially extending spokes, the periphery of each web between said spokes being curved toward the other periphery and welded thereto.

6. A vehicle wheel assembly comprising, in combination, a tubular hub, a pair of webs secured at their inner peripheries to said hub in spaced apart relationship said webs terminating at their outer peripheries in outwardly radially extending spokes each said web having its periphery between its spokes curved toward the other web and secured thereto, an annular ring member secured to the inner side of the inner web, and a brake drum secured to said ring member.

7. A vehicle wheel assembly comprising, in combination, a tubular hub member, a pair of webs secured at their inner peripheries to said hub and spaced apart therealong, each said web terminating at its outer periphery in outwardly radially extending spokes axially curved away from and aligned with the spokes of the other web and having its periphery between the spokes axially curved toward the corresponding periphery of the other web and secured thereto, and duplicate rims demountably mounted on said spokes.

8. A vehicle wheel comprising, in combination, a tubular hub, and a pair of webs having integral cylindrical portions at their inner peripheries welded to said hub and spaced apart therealong, the outer periphery of each said web terminating in outwardly radially extending spokes axially curved away from the spokes of the other web, the periphery of each web between the spokes being inwardly radially curved and axially curved toward the corresponding periphery of the other web, the said periphery of the outer web overlapping the said periphery of the inner web and being welded thereto.

9. A vehicle wheel comprising, in combination, a tubular hub having a pair of spaced apart finished outer cylindrical surfaces, a pair of webs each having an integral cylindrical portion at its inner periphery closely fitted to a respective one of said surfaces and welded thereto, each said web terminating in radially outwardly extending integral spokes axially curved away from the other web, and having its periphery between the spokes curved toward the corresponding periphery of the other web and welded thereto, each spoke being welded at its outer end to a member having radially outer surfaces to receive tire rims substantially equi-distant from the axis of the hub.

10. A vehicle wheel comprising, in combination, a hub and a pair of members assembled to form a wheel body, said members being secured at their inner peripheries to said hub in spaced apart relationship, each of said members terminating at its outer periphery in outwardly radially extending spokes, said members being entirely spaced apart from each other except where axially displaced and secured together between said spokes.

11. A vehicle wheel comprising, in combination, a hub and a pair of members assembled to form a wheel body, said members being secured at their inner peripheries to said hub in spaced apart relationship, each of said members terminating at its outer periphery in spoke ends, said members being entirely spaced apart from each other except where axially displaced and secured together in overlapping relationship between said spoke ends.

12. A vehicle wheel comprising, in combination, a hub, a pair of members assembled to form a wheel body, said members being secured at their inner peripheries to said hub in spaced apart relationship, each of said members terminating at its outer periphery in spoke ends, said members being entirely spaced apart from each other except where axially displaced and secured together in overlapping relationship between said spoke ends, and tension bolts passing through said spoke ends whereby said ends are held against distortion.

13. A vehicle wheel comprising, in combination, a tubular hub, and a pair of webs each secured at its inner periphery in spaced apart relationship on said hub, each said web terminating at its outer periphery in outwardly radially extending spokes, said webs between said spokes being axially curved toward and secured to each other, and means for demountably mounting a rim on the spokes of each web, said means including lug bolts each passing through a spoke of each web.

14. A vehicle wheel comprising, in combination, a tubular hub, a pair of webs secured at their inner perihperies in spaced apart relationship on said hub, each said web terminating at its outer periphery in integral outwardly radially extending spokes axially aligned with the spokes of the other web, said webs between said spokes being axially curved toward each other and secured to each other, and a ring member extending between and over the ends of the spokes of each web and secured thereto having outer surfaces for receiving a tire rim, each said ring member being discontinuous between a pair of spokes.

CHARLES S. ASH.

REFERENCES CITED

The following references are of record in the file of this patent:

UNITED STATES PATENTS

| Number | Name | Date |
|---|---|---|
| 1,520,810 | Copithorn | Dec. 30, 1924 |
| 1,818,573 | Nelson | Aug. 11, 1931 |
| 1,901,629 | Burger | Mar. 14, 1933 |
| 1,928,897 | Kay | Oct. 3, 1933 |
| 2,152,757 | Burger | Apr. 4, 1939 |
| 2,181,364 | Burger | Nov. 28, 1939 |

FOREIGN PATENTS

| Number | Country | Date |
|---|---|---|
| 407,920 | France | Mar. 1910 |